US012163684B2

(12) United States Patent
Miyajima

(10) Patent No.: US 12,163,684 B2
(45) Date of Patent: Dec. 10, 2024

(54) AIR-CONDITIONING CONTROL SYSTEM AND AIR-CONDITIONING EQUIPMENT

(71) Applicant: DENSO WAVE INCORPORATED, Aichi-pref. (JP)

(72) Inventor: Takahiro Miyajima, Chita-gun (JP)

(73) Assignee: DENSO WAVE INCORPORATED, Aichi-pref. (JP)

( * ) Notice: Subject to any disclaimer, the term of this patent is extended or adjusted under 35 U.S.C. 154(b) by 412 days.

(21) Appl. No.: 17/726,076

(22) Filed: Apr. 21, 2022

(65) Prior Publication Data

US 2022/0364756 A1 Nov. 17, 2022

(30) Foreign Application Priority Data

May 11, 2021 (JP) .................................. 2021-080545

(51) Int. Cl.
*F24F 11/63* (2018.01)
(52) U.S. Cl.
CPC .................... *F24F 11/63* (2018.01)
(58) Field of Classification Search
CPC ........ F24F 11/63; F24F 11/0001; F24F 11/64; F24F 2110/64; F24F 8/10
USPC ........................................................ 700/276
See application file for complete search history.

(56) References Cited

U.S. PATENT DOCUMENTS

| 5,511,006 A | * | 4/1996 | Tachibana | ................ F24F 11/64 |
| | | | | 454/187 |
| 2017/0051937 A1 | * | 2/2017 | Toyoshima | ............ G05B 15/02 |
| 2024/0219060 A1 | * | 7/2024 | Arakawa | .................. F24F 11/52 |

FOREIGN PATENT DOCUMENTS

| JP | 2001065969 A | * | 3/2001 |
| JP | 2020-051697 A | | 4/2020 |

* cited by examiner

*Primary Examiner* — Chun Cao
(74) *Attorney, Agent, or Firm* — Oliff PLC

(57) ABSTRACT

An air-conditioning control system includes: an enclosure with a ventilation opening; a particle sensor detecting particles; and a controller. The controller controls an amount of particles in a predetermined region, is switchable between first and second states, an amount of particles is controlled such that in the second state the particles existing in the predetermined region are reduced to be less than in the first, compares a detection value acquired from the particle sensor and a threshold in a case of the first state, performs a predetermined process based on the comparison, and in response to predetermined conditions being satisfied when in the second state, (a) acquires the detection value from the particle sensor, (b) determines a correction value based on the acquired detection value and a reference value, and (c) corrects, as targets for the comparison, either the threshold or the detection value, by using the correction value.

13 Claims, 13 Drawing Sheets

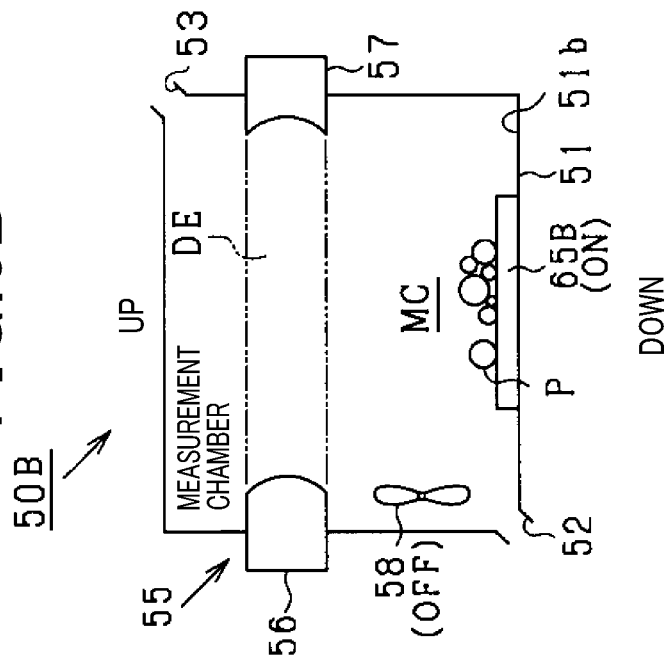
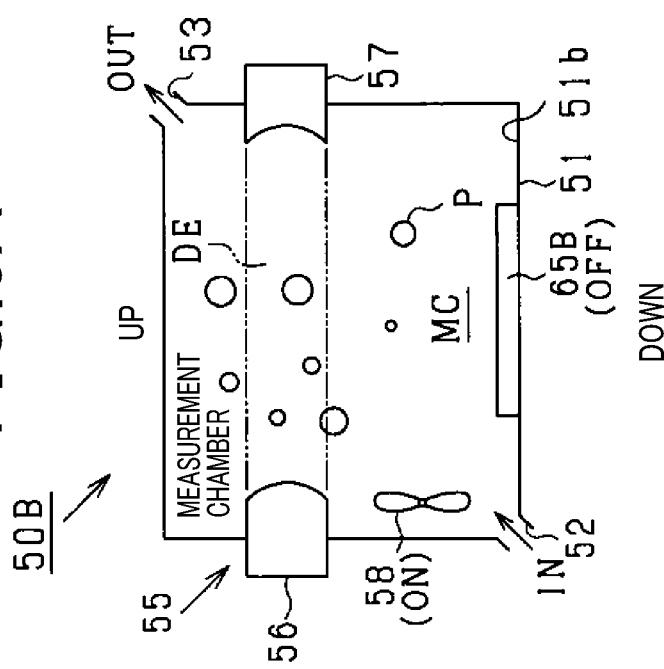

AIR-CONDITIONING CONTROL SYSTEM AND AIR-CONDITIONING EQUIPMENT

CROSS-REFERENCE TO RELATED APPLICATION

This application is based on and claims the benefit of priority from earlier Japanese Patent Application No. 2021-080545 filed May 11, 2021, the description of which is incorporated herein by reference.

BACKGROUND OF THE INVENTION

Technical Field of the Invention

The present disclosure relates to an air-conditioning control system and air-conditioning equipment.

Related Art

For buildings such as houses and vehicles such as automobiles, air-conditioning equipment is used to adjust an indoor temperature or the like for the purpose of an improvement in comfortableness. In consideration of a recent increased concern with an influence of particles (particulate substances) such as PM (Particulate matter) 2.5 on health, needs for cleaning indoor air have been increased. An example of the above-mentioned air-conditioning equipment, which is proposed to contribute to cleaning indoor air, monitors the cleanliness of air using an optical particle sensor and performs an air-conditioning control or the like in accordance with the cleanliness (for example, see JP 2020-51697 A).

SUMMARY

Here, air-conditioning equipment (an air-conditioning control system) equipped with a particle sensor may fail to fulfill a function such as air cleaning well due to deterioration of the particle sensor. This is not desirable because it becomes a factor in lowering confidence in the air-conditioning equipment. Hence, the above-mentioned air-conditioning equipment still has room for improvement.

The present disclosure is made in view of the above-described circumstances and a main object thereof is to favorably prevent lowering of confidence in air-conditioning equipment including a particle sensor.

Description will be given below on means for solving the above-described problem.

An air-conditioning control system that controls an air conditioner, the air-conditioning control system comprising:
an enclosure provided with a ventilation opening;
a particle sensor configured to detect particles existing in a predetermined region in the enclosure; and
a controller,
wherein the controller is configured to:
control an amount of particles in the predetermined region, the controller being switchable between a first state and a second state where an amount of particles is controlled such that the particles existing in the predetermined region are reduced in amount to be less than in the first state;
compare a detection value acquired from the particle sensor and a threshold in a case of the first state;
perform a predetermined process based on a result of comparing the detection value and the threshold; and
in response to predetermined conditions being satisfied when in the second state, (a) acquire the detection value from the particle sensor, (b) determine a correction value based on the acquired detection value and a reference value, and (c) correct, as targets for the comparison, either the threshold or the detection value, by using the correction value.

According to the above, the degree of the deterioration of the particle sensor can be estimated by bringing the detection environment of the particle sensor close to one corresponding to the reference value and comparing the detection value and the reference value. For example, when in the second state, particles existing in the predetermined region within the enclosure, that is, a region monitored by the particle sensor, are reduced in amount. By virtue of the detection value being acquired from the particle sensor under such a situation where the particles in the predetermined region are reduced in amount, the degree of the deterioration of the particle sensor, which is reflected in the detection value, can be found. it is possible to prevent lowering confidence in the air-conditioning control system by performing the predetermined process based on the degree of the deterioration of the particle sensor. By correcting either the detection value or the threshold associated with the predetermined process using the correction value determined based on a result of comparing the detection value and reference value, the predetermined process is less affected by the deterioration of the particle sensor. As a result, it is possible to reduce a decrease in confidence in the air-conditioning control system (the air-conditioning equipment).

The particle sensor is an optical sensor comprising a light emitter and a light receiver disposed opposite the light emitter with the predetermined region in between.

According to the above, light from the light emitter is scattered by the particles existing in the predetermined region and this reduces an amount of light reaching the light receiver. For example, with a decrease in brightness of the light emitter due to the deterioration of the light emitter or the like, the amount of light reaching the light receiver is also reduced. It is possible to acquire the amount of light reaching the light receiver (the detection value) under a situation where the amount of the particles existing in the predetermined region are reduced in amount (ideally, zero) and perform correction based on the acquired information. The degree of deterioration can thus be favorably reflected in the comparison result.

The controller is configured to control the amount particles in the predetermined region by controlling ventilation in the predetermined region.

According to the above, it is possible to control movement of the particles in the predetermined region by controlling ventilation in the predetermined region. For example, stopping or reducing ventilation makes the particles, which had been retained in the predetermined region, move to the outside of the predetermined region and keeps the particles from moving into the predetermined region.

The air conditioning control system comprises a stirring means, for controlling the amount of particles in the predetermined region, configured to stir particles within the enclosure, wherein the controller is configured to cause the stirring means to operate when in the first state and cause the stirring means to stop when in the second state, and the predetermined region is set at a position distant from a bottom of the enclosure.

With the stirring means stopped, the flow of air within the enclosure gradually becomes moderate and the particles existing within the enclosure fall to the bottom of the enclosure under their own weights. According to the above, the predetermined region, that is, the region monitored by the particle sensor, is set at a position distant from the bottom, which makes it possible to reduce the particles amount in the predetermined region. As a result, it is possible to favorably avoid light being scattered by the particles accumulated on the bottom of the enclosure.

The predetermined conditions are to be satisfied after elapse of a predetermined period of time since the stirring means is stopped, and the predetermined region is set at a position offset toward, among a ceiling and the bottom of the enclosure, the ceiling.

Even though stirring is stopped, the particles floating in the air do not immediately fall to the bottom but gradually fall over time. According to the above, by waiting for acquiring the detection value used for comparing the reference value until the particles fall to the outside of the predetermined region, it is possible to determine the more accurate correction value. Also, the predetermined region is set at a position offset toward a ceiling, which makes it possible to favorably reduce the amount of particles passing through the predetermined region and to shorten a waiting time for acquiring the detection value. Thus, it is possible to determine the correction value in a short time.

The predetermined conditions are to be satisfied after elapse of a predetermined period of time since the stirring means is stopped, the particle sensor is an optical sensor comprising a light emitter and a light receiver, and an optical axis of the light emitter is horizontal.

According to the above, by virtue of the optical axis of the light emitter being horizontal, it is possible to reduce the time for the particles falling toward the bottom due to the stop of stirring to pass through the predetermined region. This is desirable for reducing the particles remaining in the predetermined region at a timing when the predetermined time elapses after the stop of stirring as much as possible.

The air conditioning control system comprises a moving body, for controlling the amount of particles in the predetermined region, movable to a position for covering the inlet and a position for not covering the inlet, wherein
  the enclosure is provided with, as the ventilation opening, an inlet through which air enters the enclosure and an outlet through which air flows out of the enclosure,
  the moving body is configured to be placed at the position for covering the inlet where the entry of particles into the enclosure through the inlet is prevented and be placed at the position for not covering the inlet where the entry of particles into the enclosure through the inlet is not prevented, and
  the controller is configured to place the moving body at the position for not covering the inlet when in the first state and place the moving body at the position for covering the inlet when in the second state.

According to the above, by virtue of the moving body being placed at the position for covering the inlet to prevent new particles from entering through the inlet of the enclosure, the amount of the particles in the predetermined region can be reduced. Therefore, the newly entering particles can be favorably kept from hampering an improvement in correction accuracy.

The moving body is a shutter that prevents air from passing through.

According to the above, preventing both particles and air from entering is desirable for stopping the flow of air within the enclosure and keeping the particles within the enclosure from moving.

The moving body is a filter that does not prevent air from passing through while preventing the particles from passing through.

According to the above, by virtue of the moving body being a filter, it is possible to prevent new particles from entering while maintaining ventilation.

The air conditioning control system comprises a fan and a filter for controlling the amount of particles in the predetermined region, wherein
  the enclosure is provided with, as the ventilation opening, an inlet through which air enters the enclosure and an outlet through which air flows out of the enclosure,
  the fan is configured to cause air to flow out of the enclosure,
  the filter does not prevent air from passing through while preventing the particles from passing through,
  the controller is configured to place the filter at a position for not covering the inlet when in the first state and place the filter at a position for covering the inlet when in the second state, and
  the fan is configured to be driven even in a state where the filter is placed at the position for covering the inlet.

According to the above, because the fan is driven when in a state where particles are prevented by the filter from entering, the particles are discharged through the outlet with the flow of air within the enclosure. This makes it possible to reduce the number of particles remaining within the enclosure while keeping the particles from entering in the enclosure. Therefore, it is possible to favorably improve the accuracy of correction value.

The air conditioning control system comprises an adsorption means, for controlling the amount of particles in the predetermined region, of adsorbing the particles within the enclosure, wherein the controller is configured to cause the adsorption means to adsorb the particles within the enclosure when in the second state.

According to the above, in the second state, the particles within the enclosure are adsorbed to the adsorption means. This makes it possible to reduce the number of particles floating within the enclosure more reliably, contributing to an improvement in accuracy of the correction value. In addition, the particles are gathered at a specific spot with the assistance of the adsorption means. This makes it possible to favorably ease restrictions on the positions of the particle sensor and the predetermined region.

The controller is configured to, when in the second state, repeatedly acquire the detection value from the particle sensor and determine that the predetermined conditions are satisfied in response to the repeatedly acquired detection value converging within a predetermined value range.

According to the above, the predetermined conditions are determined to be satisfied in response to convergence of the detection value repeatedly acquired. This makes it possible to specify a timing, when variation of the detection value stops, without any additional physical component. For example, it is possible to prevent lowering accuracy of the correction value due to acquire the detection value before the timing. Also, it is possible to prevent delay of determining the correction value due to acquiring the detection value after the timing.

The air-conditioning equipment comprises the above-described air-conditioning control system and an air conditioner controllable by the air-conditioning control system.

It is possible to achieve prevention of lowering of confidence in air-conditioning equipment including a particle sensor.

BRIEF DESCRIPTION OF THE DRAWINGS

In the accompanying drawings:

FIGS. 9A and 9B is a schematic view illustrating a sensor unit according to a fourth embodiment;

DETAILED DESCRIPTION OF THE PREFERRED EMBODIMENTS

First Embodiment

Description will be made below on an embodiment where the present disclosure is embodied with reference to the drawings. The air-conditioning control system according to the present embodiment is embodied as air-conditioning equipment provided in a building. It should be noted that "air conditioning" according to the present embodiment means adjusting a state of air, such as temperature, moisture, and cleanliness, by cooling/heating, dehumidification/humidification, and ventilation.

Figure 1:
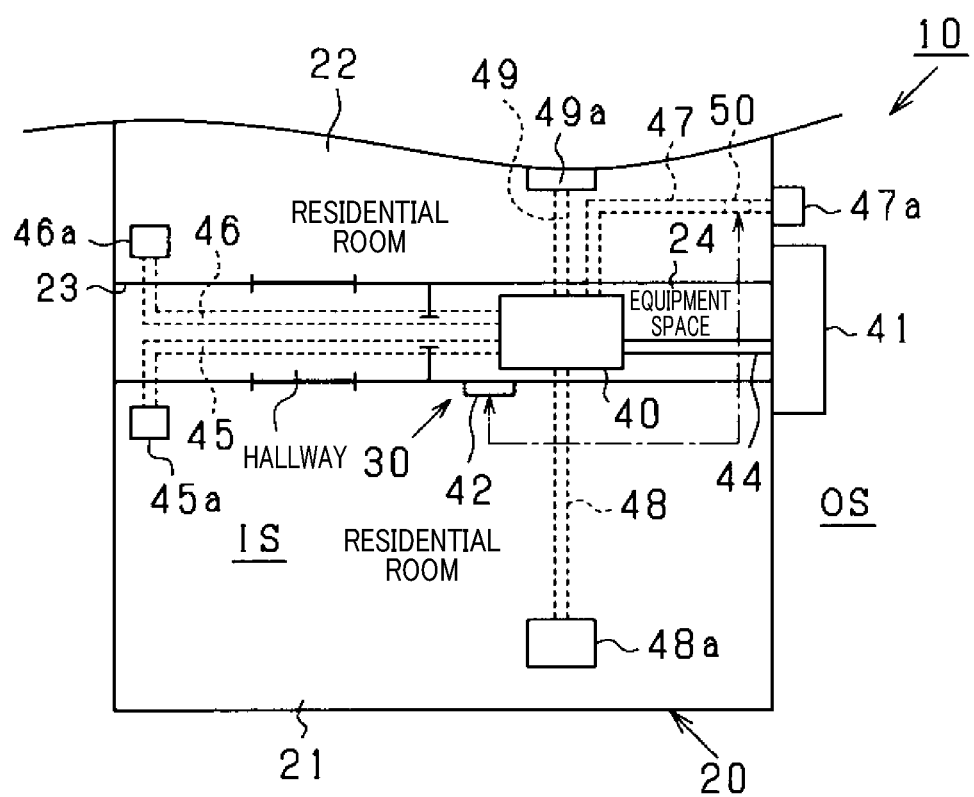
FIG. 1 is a plan view of an outline illustrating a building and air-conditioning equipment according to a first embodiment.
Figure 13:
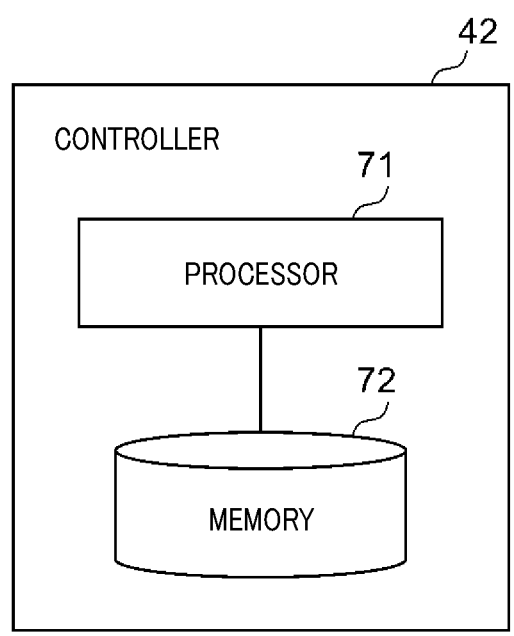
FIG. 13 is a diagram illustrating a hardware configuration of a controller.

As illustrated in FIG. 1, air-conditioning equipment 30, which is provided in a building 10, includes an air conditioner 40 installed indoors (an equipment space 24), an exterior unit 41 installed outdoors, an air-conditioning controller 42 that controls the air conditioner 40 and the exterior unit 41, a pipe for heat exchange that connects the air conditioner 40 and the exterior unit 41, intake ducts 45 to 47 through which air for air conditioning is to be taken into the air conditioner 40, supply ducts 48, 49 through which an air-conditioning air is to be supplied to residential rooms 21, 22, etc. in the building 10, and an exhaust duct (not illustrated) through which air is to be discharged outdoors. As illustrated in FIG. 13, the air-conditioning controller 42 comprises a processor 71 and a memory 72. For example, the processor 71 may be a CPU (Central Processing Unit) or a MPU (Micro Processing Unit). The memory 72 may be a ROM (Read Only Memory) or a RAM (Random Access Memory). The air-conditioning controller 42 performs switching of states associated with calibration of a particle sensor 55, comparing a threshold and a detection of the particle sensor 55, a predetermined process based on a result of the comparison, determines a correction value for correcting the detection value of the particle sensor 55, and controls apparatus connected to the air-conditioning controller 42. For example, the predetermined process may be ON/OFF switching of ventilation or displaying air cleanliness.

A plurality of residential rooms are defined in an interior space (an indoor space IS) of the building 10 with a suction opening of the above-described intake duct and a supply opening of the supply duct deposited in each of the residential rooms. For example, a suction opening 45a provided in the intake duct 45 and a supply opening 48a provided in the supply duct 48 are disposed in the residential room 21 and, likewise, a suction opening 46a provided in the intake duct 46 and a supply opening 49a provided in the supply duct 49 are disposed in the residential room 22. The building 10 according to the present embodiment is a super-sealed house, in which the air-conditioning equipment 30 (the air conditioner 40) performs air-conditioning for the entirety of the building interior (so-called central air conditioning).

In addition, the intake duct 47 extends to the outdoors with a suction opening 47a of the intake duct 47 disposed in an outdoor space OS. The air conditioner 40 can also take in outdoor air as air for air conditioning in addition to indoor air. A filter for dust collection is disposed in the suction opening 47a, reducing rubbish, dust, etc. taken through the intake duct 47 into the building. The air-conditioning air circulating inside the building is partly replaced with outside air, thereby reducing a decrease in the cleanliness of the circulating air-conditioning air. It should be noted that ventilation provided by the air-conditioning equipment 30 may be performed in combination with air blowing in addition to being performed in combination with cooling/heating or dehumidification/humidification.

Here, options for a mode for the air-conditioning equipment 30 to take in outside air (ventilation mode) include a normal ventilation mode, a gentle ventilation mode in which the intake amount of an outside air per unit of time is smaller than in the normal ventilation mode, a normal stop mode in which ventilation is to be stopped in response to stop instructions from a user, and a special stop mode in which ventilation is to be stopped in accordance with an air-conditioning status or the like. During the operation of air-conditioning equipment 30, either the normal ventilation mode or the gentle ventilation mode is basically set as the ventilation mode. In addition, options for switching these ventilation modes include automatic switching where the air-conditioning controller 42 monitors the state of air (cleanliness) and switching is automatically performed based on the monitoring result and manual switching where switching is performed based on instructions from a user.

Figure 2:
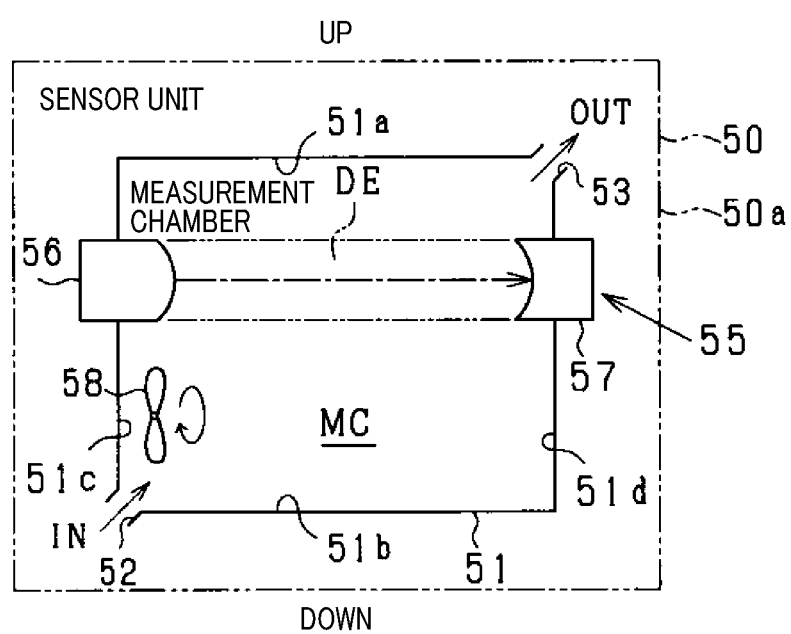
FIG. 2 is a schematic view illustrating a sensor unit.

Here, a supplementary description will be made on a configuration for monitoring the state of air. As illustrated in FIG. 1, a sensor unit 50 is disposed in the intake duct 47 for intake of an outside air, the sensor unit 50 being configured to detect specific particles such as PM2.5 contained in an outside air entering the duct. As illustrated in FIG. 2, the sensor unit 50 includes a case 50a which houses a sensor block. The sensor block includes an enclosure 51 forming a measurement chamber MC and a particle sensor 55 that detects the specific particles existing in a predetermined region (hereinafter, referred to as detection region DE) in the measurement chamber MC. A portion of the case 50a facing a flow path of the intake duct 47 is provided with a plurality of openings and an inside of the case 50a and the flow path of the intake duct 47 are in communication with each other through these openings. In the description below, the "specific particles", that is, a target for the sensor unit 50 (the particle sensor 55) to measure, are referred to simply as particles for the purpose of convenience.

A lower portion of the enclosure 51 is provided with an inlet 52 (corresponding to a "ventilation opening") through which the outside air flowing through the intake duct 47 partly enters, whereas an upper portion of the enclosure 51 is provided with an outlet 53 (corresponding to a "ventilation opening") through which the outside air entering through the inlet 52 flows out. These inlet 52 and outlet 53 are at diagonal corners of the enclosure 51.

In addition, a fan 58 is disposed in the enclosure 51 as a stirring means of stirring air and particles within the measurement chamber MC. The fan 58 is located above the inlet 52 and a moderate rotation of the fan 58 causes a moderate flow of air from an inlet 52 side toward an outlet 53 side. The air stirred by the fan 58 passes through the above-described detection region DE and flows out through the outlet 53. Then, a fresh outside air enters through the inlet 52 with the outflow of the air within the measurement chamber MC. That is to say, the fan 58 according to the present embodiment also functions as a freshening means of freshening the air within the measurement chamber MC.

The particle sensor 55 includes a light emitter 56 that outputs light having a strong directionality (for example, a laser beam) and a light receiver 57 that receives the light outputted from the light emitter 56, the light emitter 56 and the light receiver 57 being located opposite each other with the detection region DE in between. In more detail, the light emitter 56 is located such that the direction of an optical axis thereof is set horizontal and intersects a straight line connecting the above-described inlet 52 and outlet 53 and the optical axis. The light from the light emitter 56 passes through the detection region DE, being applied to the light receiver 57. Here, in a case where there are particles in the detection region DE, the light from the light emitter 56 partly hits the particles to be scattered and thus are unlikely to reach the light receiver 57. That is to say, the amount of light received by the light receiver 57 is reduced with an increase in the amount of particles existing in the detection region DE (a decrease in cleanliness), whereas being increased with a reduction in the amount of particles existing in the detection region DE (an increase in cleanliness).

The fan 58 and the particle sensor 55 are both connected to the air-conditioning controller 42. The fan 58 is basically kept driven at a constant speed during the operation of the air conditioner 40. Detection information regarding particles (the amount of light received) provided by the particle sensor 55 is inputted to the air-conditioning controller 42 and the air-conditioning controller 42 can switch the ventilation mode based on the detection information. Here, description will be given of a process for switching the ventilation mode, which is to be performed by a control section of the air-conditioning controller 42 (a ventilation mode automatic switching process), in a case where the above-described automatic switching is ON with reference to FIG. 3. It should be noted that the ventilation mode automatic switching process is a process to be performed as a part of a periodic process by the control section of the air-conditioning controller 42.

In the ventilation mode automatic switching process, it is first determined whether the current ventilation mode is the special stop mode in Step S101. In a case where it is not the special stop mode, the process proceeds to Step S102. In Step S102, it is determined whether a timing for starting preparation for calibration has come. In a state (corresponding to a second state) from starting preparation for calibration to the end of calibration an amount of the particles is controlled such that the particles existing in the detection region DE is reduced to be less than in a state (corresponding to a first state) after calibration and before starting preparation for the calibration. A configuration for the calibration will be described later. In a case where the result of the determination becomes negative in Step S102, the process proceeds to Step S103. In Step S103, the detection information (the amount of light received) is acquired from the particle sensor 55 and it is determined whether the amount of particles contained in the outside air flowing through the intake duct 47 exceeds a threshold based on the acquired detection information. Specifically, it is determined whether the amount of light received by the light receiver 57 falls below a threshold.

In a case where the amount of light received falls below the threshold, that is, the cleanliness of the outside air is low, the result of the determination becomes positive in Step S103 and the process proceeds to Step S104. In Step S104, a process is performed to set the gentle ventilation mode as the ventilation mode. In this process, in a case where the current ventilation mode is the gentle ventilation mode, the gentle ventilation mode is maintained, whereas in a case where the current ventilation mode is the normal ventilation mode, switching to the gentle ventilation mode is performed. By virtue of switching to the gentle ventilation mode, a smaller amount of an outside air is taken in thorough the intake duct 47, resulting in reducing the entry of particles from outdoors to indoors.

In a case where the amount of light received is equal to or more than the threshold, that is, the cleanliness of the outside air is high, the result of the determination becomes negative in Step S103 and the process proceeds to Step S105. In Step S105, a process is performed to set the normal ventilation mode as the ventilation mode. In this process, in a case where the current ventilation mode is the normal ventilation mode, the normal ventilation mode is maintained, whereas in a case where the current ventilation mode is the gentle ventilation mode, switching to the normal ventilation mode is performed. In the present embodiment, the sensor unit 50 and the air-conditioning controller 42 implement an air-conditioning control system.

Here, the air-conditioning equipment 30, which includes the particle sensor 55, would fail to fulfill a function to adjust an intake amount of an outside air in accordance with the cleanliness of air well due to a deterioration of the particle sensor 55. Specifically, a reduction in a light intensity of a laser beam attributed to a deterioration of the light emitter 56 or a reduction in the amount of a laser beam received attributed to a deterioration of the light receiver 57 would cause the particle sensor 55 to erroneously recognize that particles exist in the detection region DE more than in reality, resulting in setting the gentle ventilation mode under a situation where ventilation should have been performed in the normal ventilation mode and lowering the amount of ventilation. In particular, a deterioration rate of the particle sensor 55 may depend greatly on an individual difference, an environment where the particle sensor 55 is in use, or the like and, accordingly, even a possibility that an influence of deterioration appears earlier than predicted is undeniable. Such an event is not desirable because it becomes a factor in lowering confidence in the air-conditioning equipment 30. One of the features of the present embodiment is that an effort is made in consideration of such circumstances. Specifically, calibration for reducing an influence of a deterioration of the particle sensor 55 is to be periodically performed. Description will be made below on a configuration for the calibration.

Figure 3:
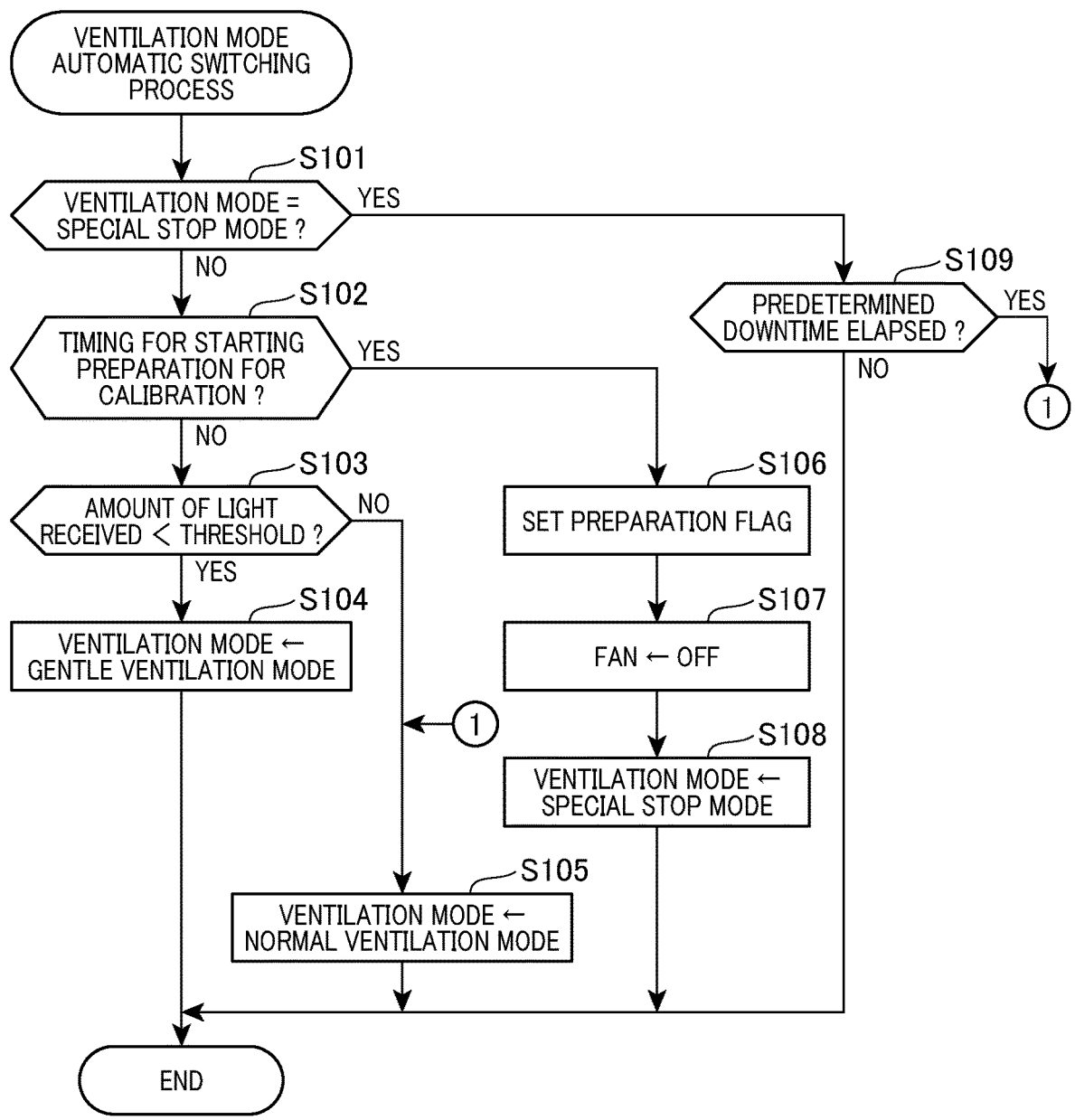
FIG. 3 is a flowchart illustrating a ventilation mode automatic switching process.

In the ventilation mode automatic switching process illustrated in FIG. 3, it is determined whether a timing for starting preparation for calibration has come in Step S102 as already described. Specifically, it is determined whether a predetermined period of time (for example, one month) has elapsed since when the previous calibration was performed. In response to the result of the determination becoming positive in Step S102, a preparation flag is set in Step S106 and then the fan 58 of the sensor unit 50 is stopped in Step S107. Subsequently, the ventilation mode is switched to the special stop mode in Step S108 and then the ventilation mode automatic switching process is terminated.

Returning to the description of Step S101, in a case where the ventilation mode is the special stop mode, the result of the determination becomes positive in Step S101 and the process proceeds to Step S109. In Step S109, it is determined whether a predetermined downtime (in the present embodiment, six hours) has elapsed since when the special stop mode was set. In a case where the predetermined downtime has not elapsed, the ventilation mode automatic switching process is simply terminated. In a case where the predetermined downtime has elapsed, switching to the normal ventilation mode is performed in Step S105 and then the ventilation mode automatic switching process is terminated.

Figure 4A:
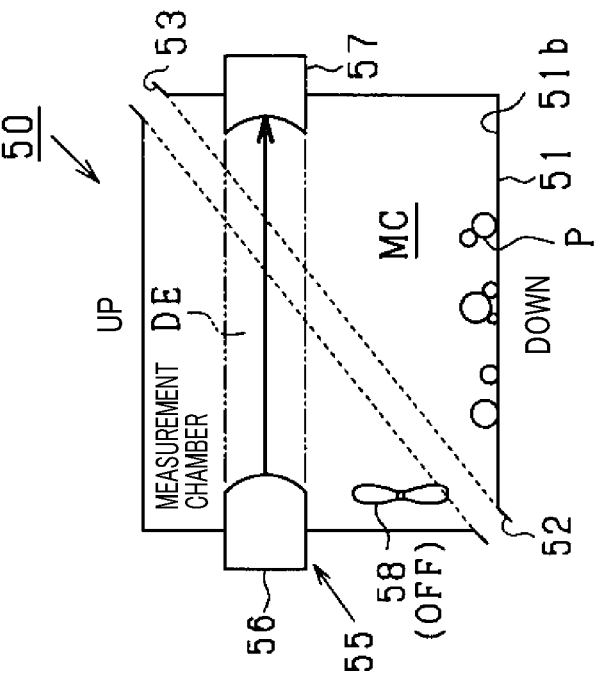
FIGS. 4A and 4B is a schematic view illustrating how particles are within a housing.
Figure 4B:
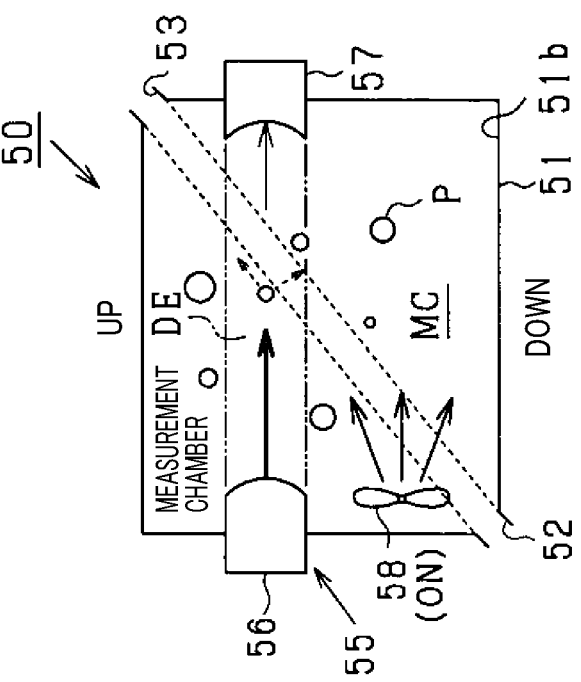
Figure 5:
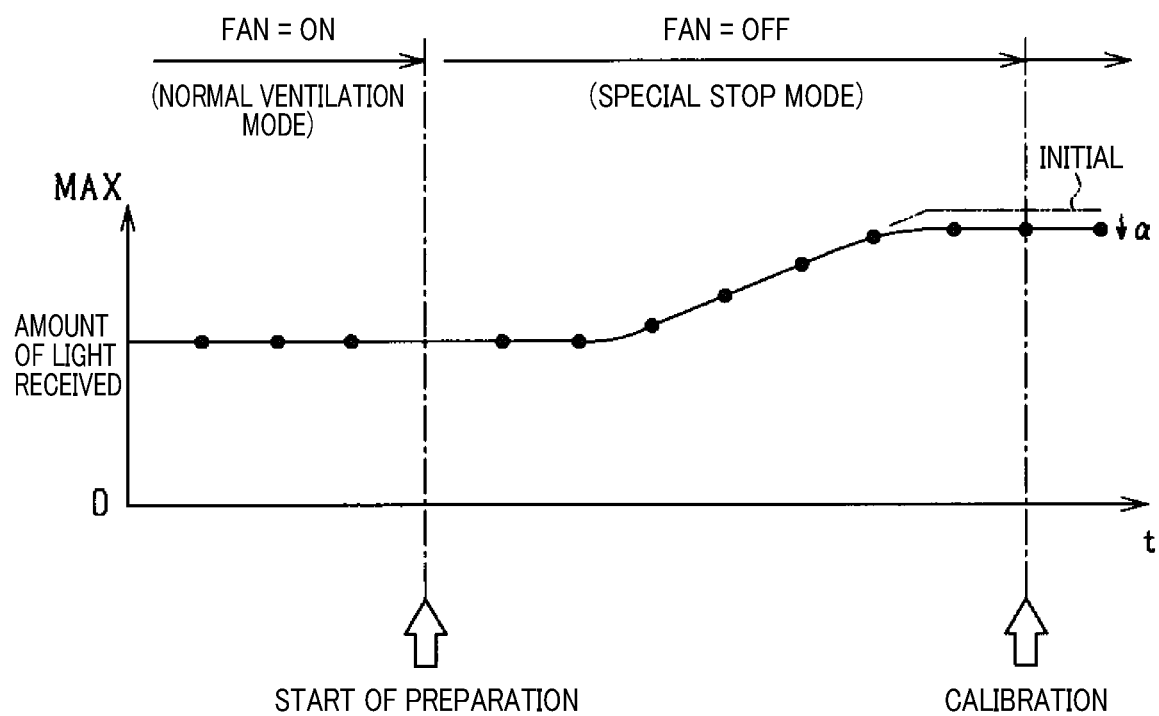
FIG. 5 is a schematic view illustrating transition of the amount of light received.

As illustrated in FIG. 4A and FIG. 4B, the stirring in the measurement chamber MC is terminated by stopping the fan 58 of the sensor unit 50, causing the flow of air in the measurement chamber MC to be gradually weakened over time. Then, with the flow of air weakened, particles floating in the air (target particles to measure) fall to a bottom 51b of the enclosure 51 under their own weights and almost all thereof stay on the bottom 51b. That is to say, the amount of the particles existing in the detection region DE (target particles to measure) decreases over time and, eventually, reaches almost zero. As illustrated in FIG. 5, in a case where the fan 58 is stopped and the special stop mode is on, the amount of light received increases with a decrease in the number of particles existing in the detection region DE. The above-described predetermined downtime is defined longer than time necessary for letting the particles existing in the detection region DE fall to the bottom 51b and the amount of light received reaches the maximum when the number of the particles existing in the detection region DE reaches zero.

It should be noted that in the present embodiment, in performing the calibration, the special stop mode is set as the ventilation mode. The fan 58 is stopped and the flow of air (outside air) through the intake duct 47 is also stopped as described above, thereby avoiding the measurement chamber MC being affected by the flow of air. That is to say, particles within the intake duct 47 are kept from newly entering the measurement chamber MC. However, even if particles newly enter the measurement chamber MC while the fan 58 is driven, the normal ventilation mode or the gentle ventilation mode (desirably, the gentle ventilation mode) may be set as the ventilation mode even during preparation for the calibration as long as those particles are prevented from reaching the detection region DE and the particles accumulated on the bottom 51b are prevented from rising to reach the detection region DE.

Figure 6:
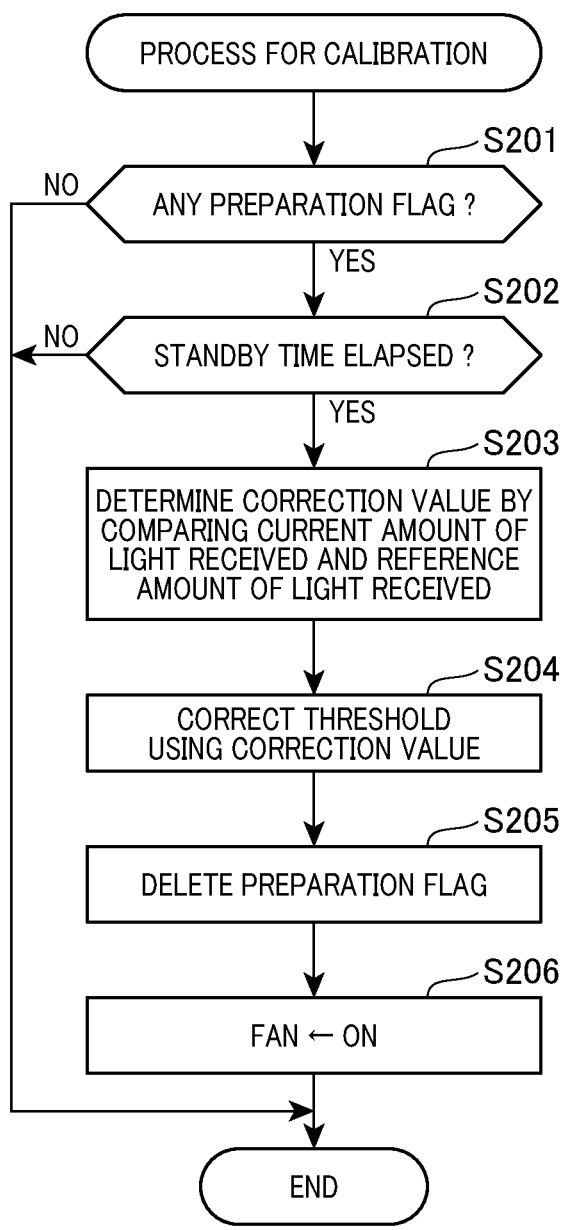
FIG. 6 is a flowchart illustrating a process for calibration.

Next, description will be made on a process for calibration, which is to be performed as a part of a periodic process by the air-conditioning controller 42, with reference to FIG. 6.

In the process for calibration, it is first determined whether the preparation flag is set in Step S201. In a case where the preparation flag is set, the process proceeds to Step S202. In Step S202, it is determined whether a standby time has elapsed. The standby time is set slightly shorter than the above-described predetermined downtime, thereby causing a process in Step S203 and subsequent steps to be performed before the elapse of the predetermined downtime.

In a case where the standby time has elapsed, the process proceeds to Step S203. In Step S203, detection information (the amount of light received) is acquired from the particle sensor 55 and a correction value is determined by comparing the acquired amount of light received and a reference amount of light received. Specifically, a measured amount of light received is subtracted from the reference amount of light received and a thus obtained difference (see "a" in FIG. 5) is determined as the correction value. The reference amount of light received according to the present embodiment is an initial amount of light received by the particle sensor 55, that is, the amount of light received before occurrence of deterioration (for example, an initial measured value); however, a setting value such as a catalog value indicating a performance of the particle sensor 55 may be defined as the reference amount of light received.

Figure 7:
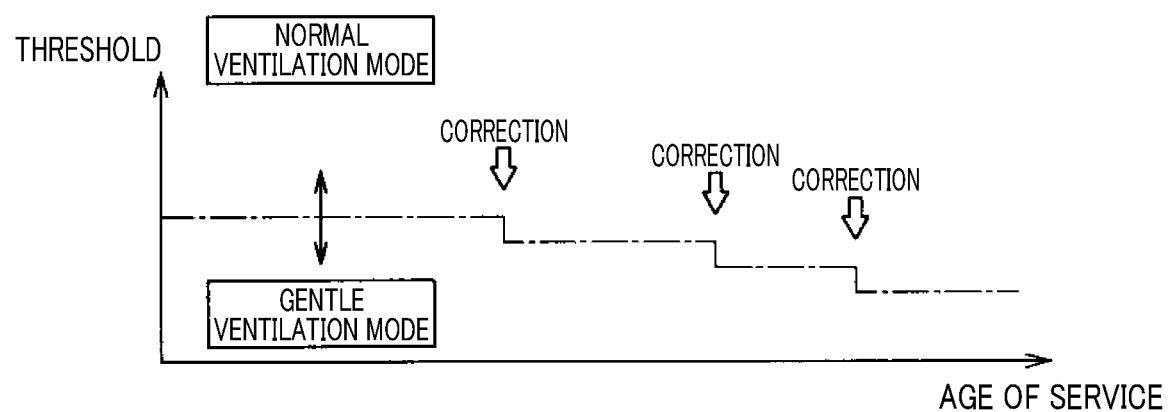
FIG. 7 is a schematic view illustrating a change in threshold.

In subsequent Step S204, the above-described threshold (the threshold for performing automatic switching between the normal ventilation mode and the gentle ventilation mode) is corrected by using the correction value determined in Step S203. Specifically, the above-described correction value is subtracted from the threshold (a reference threshold that is a setting value stored in advance), thereby determining a new threshold that is to be referred to from this time. That is to say, in performing automatic switching from this time, the ventilation mode is to be switched based on the newly set threshold. A decrease in the amount of light received with the progress of the deterioration of the particle sensor 55 causes the threshold to be lowered by the correction in accordance with the amount of the decrease (see FIG. 7). This makes it possible to reduce an influence of the deterioration.

After that, the preparation flag is deleted in Step S205 and the operation of the fan 58 is restarted in Step S206, and then the present process for calibration is terminated.

The first embodiment described above in detail can be expected to have the following excellent effects.

After the fan 58 is stopped, the flow of air becomes weak and particles floating in the measurement chamber MC fall to the bottom 51b of the enclosure 51 under their own weights. The detection information (the amount of light received) is acquired from the particle sensor 55 only after the appropriate time when the particles accumulate on the bottom 51b arrives, thereby making it possible to find the degree of the deterioration of the particle sensor 55 reflected in the detection information. This is because a significant decrease in the number of the particles existing in the detection region DE makes a laser beam unlikely to be scattered by the particles. By virtue of determining a correction value based this detection information and correcting a threshold, as determination reference, by using the correction value, it is possible to make the switching function for the ventilation mode more unlikely to fail to work well due to the influence of the deterioration of the particle sensor 55. This makes it possible to favorably reduce a decrease in confidence in the air-conditioning control system (the air-conditioning equipment 30).

The particle sensor 55 is an optical sensor including the light emitter 56 and the light receiver 57 disposed opposite the light emitter 56 with the detection region DE in between. Light from the light emitter 56 is scattered by the particles existing in the detection region DE to reduce the amount of light reaching the light receiver 57. For example, with a decrease in brightness of the light emitter 56 due to deterioration or the like, the amount of light reaching the light receiver 57 is also reduced. The amount of light reaching the light receiver 57 (the amount of light received) can be acquired under a situation where the amount of the particles existing in the detection region DE is considerably reduced (ideally, zero) and correction can be performed based on the acquired detection information, which makes it possible to favorably reflect the degree of deterioration in the comparison result.

The air-conditioning controller 42 is configured to control ventilation in the detection region DE, which makes it possible to control movement of the particles in the detection region DE. For example, stopping or reducing ventilation makes the particles, which had been retained in the detection region DE, move to the outside of the detection region DE and keeps the particles from moving into the detection region DE. Specifically the fan 58 has a function to stir the particles within the measurement chamber MC and a function to newly take in particles along with outside air flowing through the intake duct 47. With the fan 58 stopped, the particles retained in the detection region DE move to the outside of the detection region DE under their own weights, while the particles are kept from moving into the detection region DE from the outside of the detection region DE. This makes it possible to reduce the particles existing in the detection region DE. Also, instead of stopping the fan 58, the below-described inlet 52 may be closed by using the below-described shutter 61A for controlling ventilation.

With the fan 58 stopped, the flow of air in the measurement chamber MC gradually becomes moderate and the particles existing in the measurement chamber MC fall to the bottom 51b of the enclosure 51 under their own weights. The detection region DE is set at a position distant from the bottom 51b, which makes it possible to decrease the particles existing in the detection region DE. As a result, it is possible to favorably avoid light being scattered by the particles accumulated on the bottom 51b. Meanwhile, even though the fan 58 is stopped, the particles floating in the air do not immediately fall to the bottom 51b but gradually fall over time. Accordingly, the detection region DE is set at a position offset toward a ceiling 51a, which makes it possible to favorably reduce the amount of particles still passing through the detection region DE even after the elapse of the above-described standby time.

The optical axis of the laser beam is horizontal (lateral). This makes it possible to reduce time for the particles falling toward the bottom 51b due to the stop of stirring to pass through the detection region DE. This is desirable for reducing the particles remaining in the detection region DE at a timing when the above-described standby time elapses after the stop of stirring as much as possible.

Second Embodiment

Figure 8B:
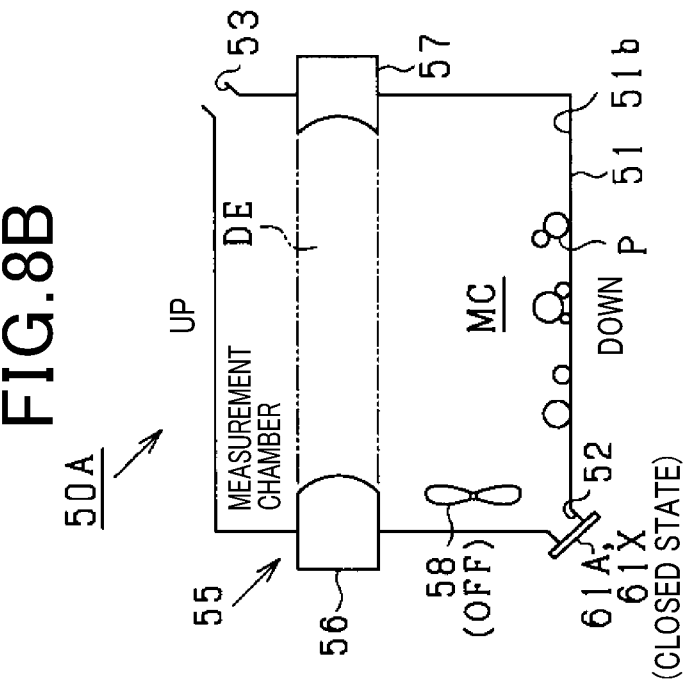
FIGS. 8A and 8B is a schematic view illustrating a sensor unit according to a second and a third embodiment.
Figure 8A:
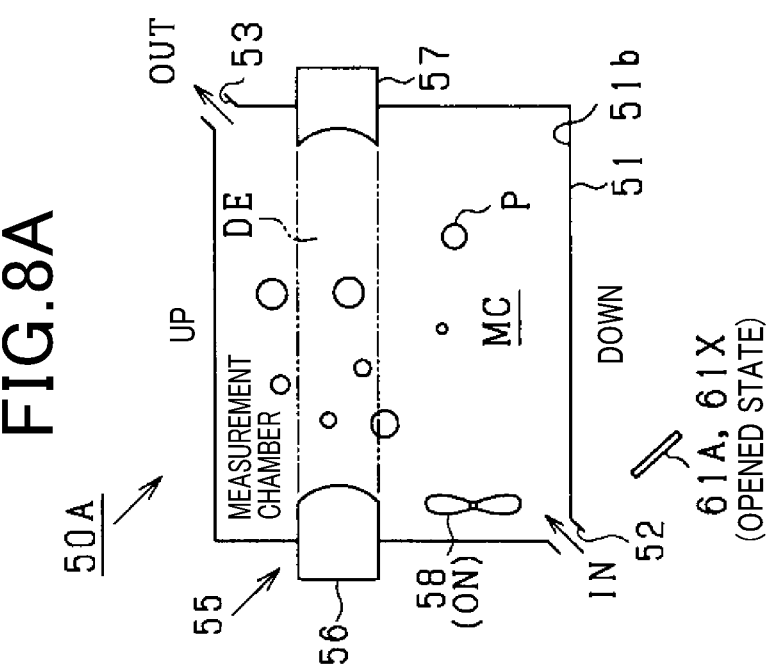

In the above-described first embodiment, the fan 58 is stopped during preparation for calibration, thereby reducing the entry of new particles into the measurement chamber MC. However, in a configuration where the inlet 52 is always open, particles, the amount of which is small, would still enter the measurement chamber MC as long as outside air passes through the intake duct 47. In consideration of such circumstances, the special stop mode is set as the ventilation mode when the fan 58 is stopped, thereby enhancing a function to reduce the entry of new particles into the measurement chamber MC in the first embodiment. The present embodiment is different from the first embodiment in a configuration for reducing the entry of new particles during preparation for calibration. Referring to FIG. 8A and FIG. 8B, description will be made below on a characteristic configuration of the present embodiment with a focus on a difference from the first embodiment.

A sensor unit 50A according to the present embodiment is provided with a shutter 61A (corresponding to a "moving body") movable to a position for covering the inlet 52 of the enclosure 51 and a position for not covering the inlet 52. The shutter 61A is switchable between a closed state to cause the inlet 52 of the enclosure 51 to be closed at the position for covering the inlet 52 and an opened state to cause the inlet 52 to be opened at the position for not covering the inlet 52. A driver for the shutter 61A is connected to the air-conditioning controller 42 and the driver operates based on a drive signal from the air-conditioning controller 42.

In a case where the shutter 61A is in the opened state, an outside air and particles are permitted to enter the measurement chamber MC through the intake duct 47, whereas in a case where the shutter 61A is in the closed state, the inlet 52 is closed by the shutter 61A and thus outside air and particles are not permitted to enter the measurement chamber MC through the intake duct 47.

In starting the above-described preparation for calibration, the fan 58 of the sensor unit 50A is stopped and the shutter 61A is switched from the opened state to the closed state. This makes it possible to favorably reduce the entry of new particles without the necessity of setting the special stop mode as the ventilation mode even during the preparation for calibration. Accordingly, in the present embodiment, the normal ventilation mode or the gentle ventilation mode is maintained as the ventilation mode even during the preparation for calibration, thereby reducing a period of time when the ventilation function of the air-conditioning equipment 30 is invalid as much as possible. In other words, the preparation for calibration is performed irrespective of the ventilation mode, which makes it possible to favorably ease restrictions on a timing for calibration, etc.

It should be noted that the inlet 52 is opened and closed with the shutter 61A in the present embodiment; however, the outlet 53 is also provided with a similar shutter. That is to say, in starting the preparation for calibration, both the inlet 52 and the outlet 53 may be closed by the shutters.

Third Embodiment

The sensor unit 50A according to the above-described second embodiment is configured to reduce the entry of air and particles thorough the intake duct 47 by closing the inlet 52 with the shutter 61A. In the present embodiment, the shutter 61A is replaced with a movable filter 61X (corresponding to the "moving body") that does not let particles through while letting air through (see FIG. 8A and FIG. 8B).

In starting the preparation for calibration, the filter 61X is placed at a position for covering the inlet 52, thereby preventing the entry of new particles through the inlet 52. Further, the operation of the fan 58 is continued even during the preparation for calibration. With the operation of the fan 58 continued, the air within the measurement chamber MC is caused to flow out through the outlet 53 while air is caused to enter from the intake duct 47 through the inlet 52. That is to say, the ventilation of the measurement chamber MC is continued. The ventilation causes the particles within the measurement chamber MC to be gradually discharged from the measurement chamber MC.

Thus, the number of particles existing within the measurement chamber MC itself is reduced. This configuration makes it possible to favorably avoid, in performing calibration, the movement of the particles within the measurement chamber MC to the detection region DE. This can contribute to improving the accuracy of calibration. In addition, the particles are forcefully discharged from the measurement chamber MC. This configuration is desirable for reducing a preparation time for calibration.

It should be noted that the operation of the fan 58 is continued even during the preparation for calibration in the present embodiment; however, a configuration where the fan 58 is stopped during the preparation for calibration as in the second embodiment or the like is also acceptable.

Fourth Embodiment

In the present embodiment, an effort is made for the above-described improvement in the accuracy of calibration and reduction in the preparation time for calibration. Referring to FIG. 9A and FIG. 9B, description will be made below on a characteristic configuration of the present embodiment with a focus on a difference from the first embodiment.

A sensor unit 50B according to the present embodiment is provided with a collecting means of collecting the particles within the measurement chamber MC in performing the preparation for calibration. Specifically, an adsorption pad 65B to which particles can be adsorbed by static electricity is disposed on the bottom 51b of the enclosure 51 at a position where wind from the fan 58 is to be applied. The adsorption pad 65B, which is connected to the air-conditioning controller 42, is to be switched between an adsorption state and a non-adsorption state by the air-conditioning controller 42.

When the preparation for calibration is started, the fan 58 is stopped and the adsorption pad 65B is switched from the non-adsorption state to the adsorption state. The particles existing in the measurement chamber MC are thus attracted to the adsorption pad 65B. Since the adsorption pad 65B is maintained in the adsorption state during the preparation for calibration, the particles adsorbed to the adsorption pad 65B are kept from moving to the detection region DE. Further, since the fan 58 is stopped, none of the adsorbed particles is caused to rise by the fan 58.

After calibration is performed, the operation of the fan 58 is restarted and the adsorption pad 65B is switched from the adsorption state to the non-adsorption state. The adsorbed particles are thus released from adsorption, being gradually discharged through the outlet 53 over time.

The particles existing in the measurement chamber MC are adsorbed to the adsorption pad 65B during the preparation for calibration, which makes it possible to reduce the number of the particles floating in the measurement chamber MC to contribute to an improvement in the accuracy of calibration. In addition, the particles are gathered at a specific spot with the assistance of the adsorption pad 65B. This configuration makes it possible to favorably ease restrictions on the positions of the particle sensor 55 and the detection region DE.

It should be noted that the adsorption pad 65B is located on the bottom 51b of the enclosure 51 in the present embodiment; however, the adsorption pad 65B can be located as desired. For example, it may be disposed on the ceiling 51a or a side wall of the enclosure 51. However, locating the adsorption pad 65B on the bottom 51b is advantageous for keeping the adsorbed particles from moving under their own weights or keeping the particles from remaining on the adsorption pad 65B, which is the non-adsorption state, by the fan 58 blowing air to the adsorption pad 65B without the necessity of unreasonably increasing an adsorption force.

Fifth Embodiment

Figure 10A:
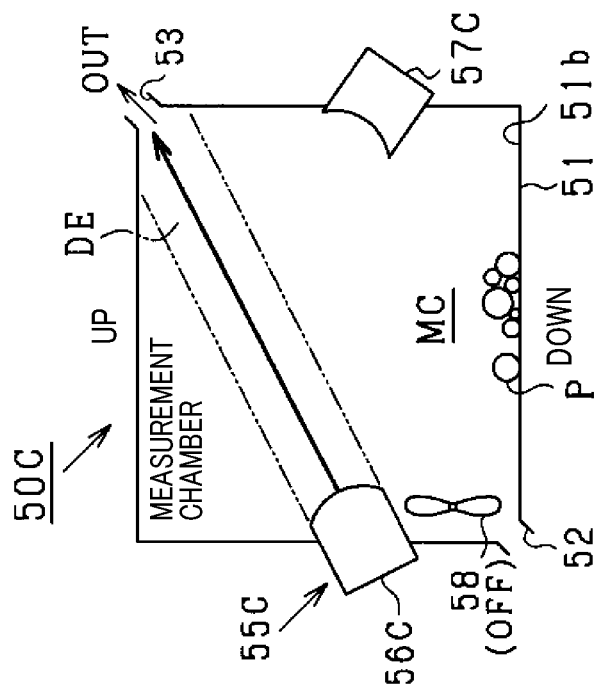
FIGS. 10A and 10B is a schematic view illustrating a sensor unit according to a fifth embodiment.
Figure 10B:
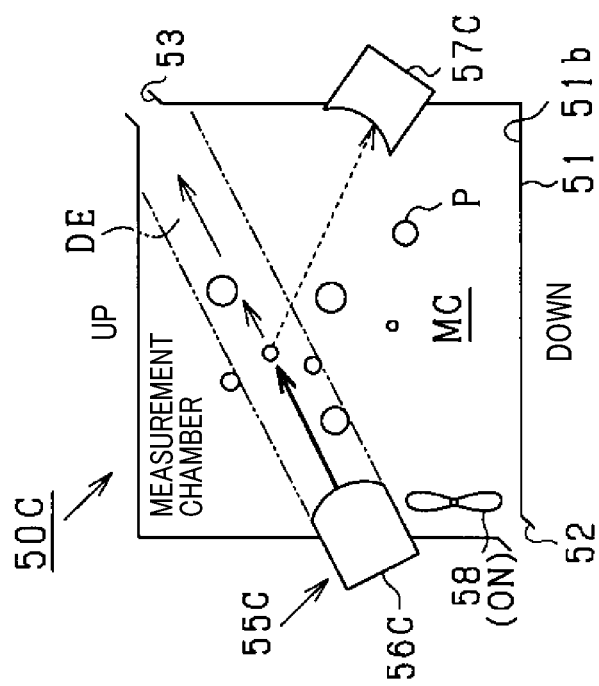

In the sensor unit 50 according to the above-described first embodiment or the like, the particle sensor 55 is located with the light emitter 56 and the light receiver 57 opposite each other. The present embodiment is different from the first embodiment or the like in orientations of a light emitter and a light receiver. Referring to FIG. 10A and FIG. 10B, description will be made below on a sensor unit 50C according to the present embodiment with a focus on a difference from the sensor unit 50 according to the first embodiment.

A light emitter 56C is changed in orientation such that a laser beam is to be outputted obliquely upward. Although a laser beam irradiation range corresponds to the detection region DE for particles as in the first embodiment or the like, a light receiver 57C is located at a position out of the irradiation range in the present embodiment, whereas the light receiver 57 is located in the laser beam irradiation range in the above-described first embodiment. That is to say, the light receiver 57C is not directly irradiated with a laser beam from the light emitter 56C.

When a laser beam outputted from the light emitter 56C hits particles lying in the detection region DE, the laser beam is partly scattered. The scattered part of the light reaches the light receiver 57C, causing the particles to be detected. That is to say, in the present embodiment, the amount of light received by the light receiver 57C increases with an increase in the number of the particles existing in the detection region DE, whereas the amount of light received by the light receiver 57C decreases with a decrease in the number of the particles in the detection region DE.

Figure 11A:
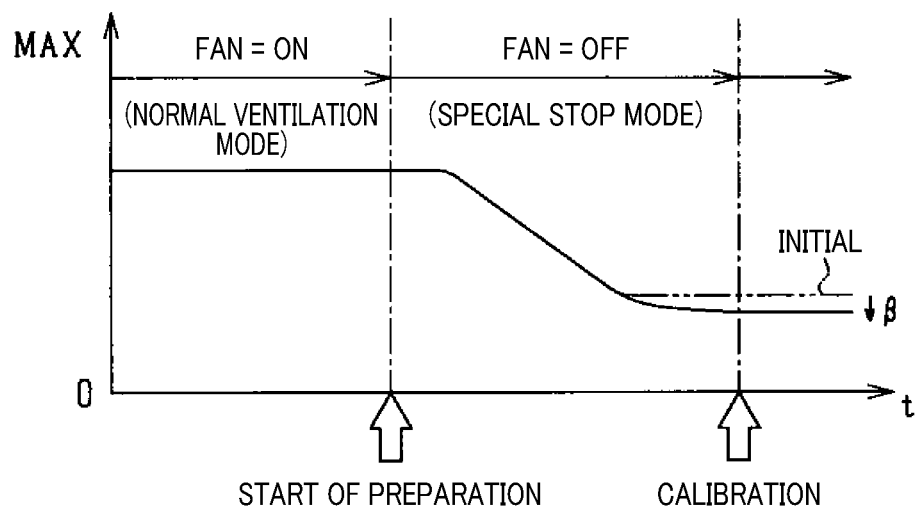
FIG. 11A is a schematic view illustrating transition of the amount of light received according to a fifth embodiment and FIG. 11B is a schematic view illustrating a change in threshold according to a fifth embodiment
Figure 11B:
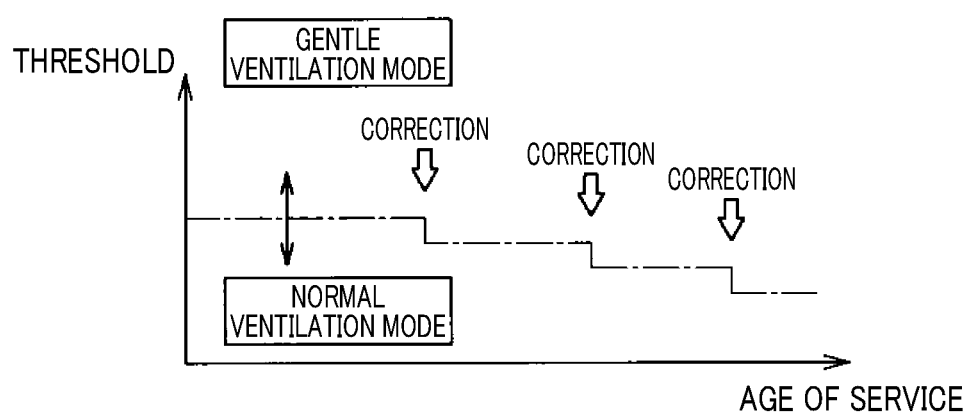

In performing calibration, the amount of light received by the light receiver 57C is acquired and the amount of light received and the reference amount of light received are compared as in the first embodiment. Then, a value given by subtracting the measured amount of light received from the reference amount of light received (a decreased amount $\beta$: see FIG. 11A) is defined as a correction value and the correction value is subtracted from the threshold to set a new threshold. A decrease in the amount of light received with the progress of the deterioration of the particle sensor 55 causes the threshold to be lowered by correction in accordance with the amount of the decrease (see FIG. 11B). This makes it possible to reduce an influence of the deterioration.

It should be noted that the enclosure 51 may be changed such that light applied to an inner surface of the enclosure 51 is absorbed into the inner surface and the amount of light received becomes zero in a case where the number of the particles existing in the detection region DE is zero. In this case, it is sufficient if the above-described reference amount of light received is zero.

Sixth Embodiment

Figure 12:
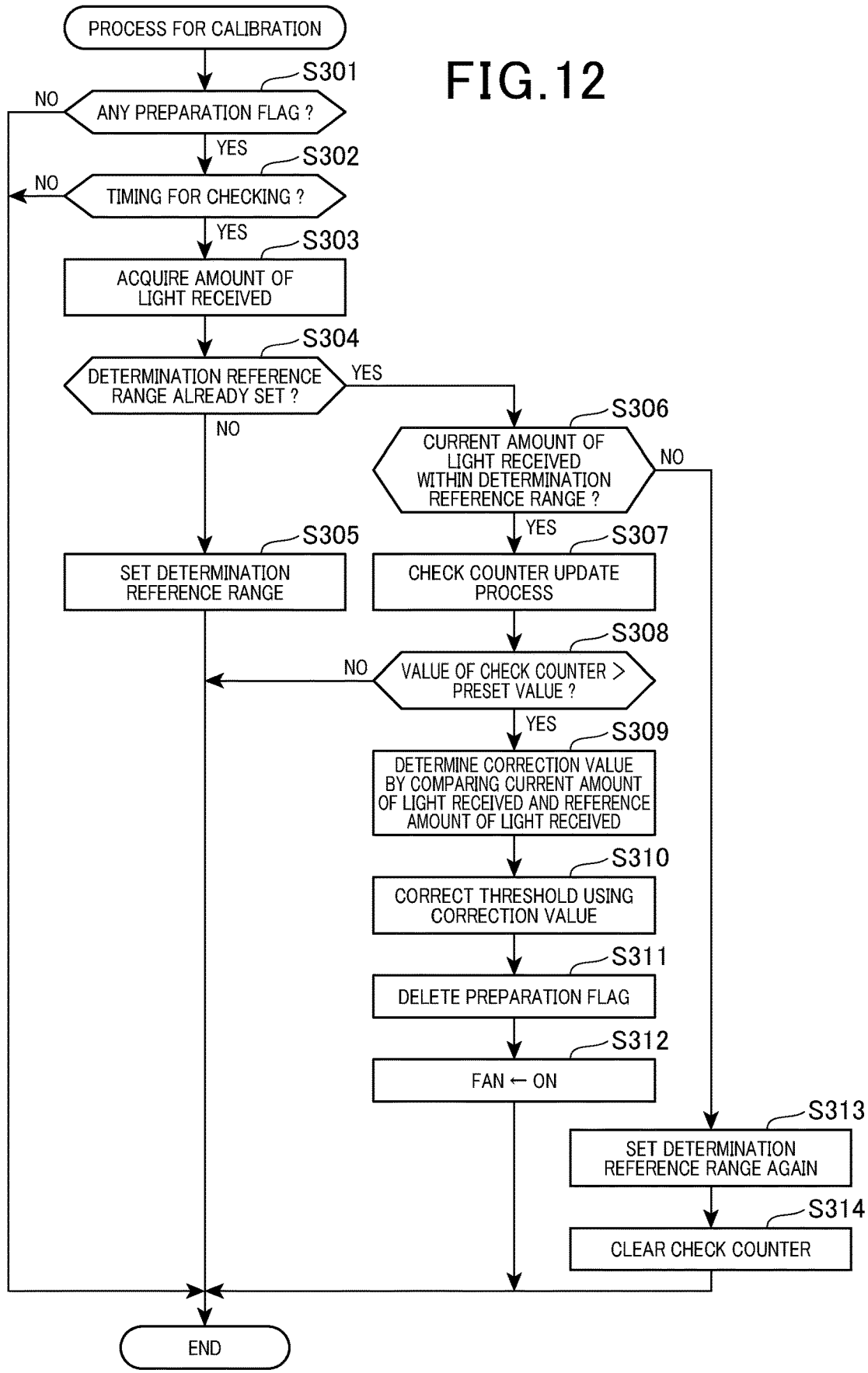
FIG. 12 is a flowchart illustrating a process for calibration according to a sixth embodiment.

In the above-described first embodiment or the like, calibration is performed after the elapse of the standby time set in advance since the start of the preparation for calibration. The present embodiment is different from the first embodiment or the like in a configuration for performing calibration (a process for calibration). Description will be made below on the process for calibration according to the present embodiment with reference to FIG. 12.

In the process for calibration according to the present embodiment, it is first determined whether a preparation flag for calibration is set (Step S301). In a case where the preparation flag is set, it is determined whether a timing for checking the amount of light received has come (Step S302). In a case where the timing for checking the amount of light received has come, detection information (the current amount of light received) is acquired from the particle sensor 55 (Step S303).

After that, it is determined whether a determination reference range for determining a change in the amount of light received is set (Step S304). In a case where no determination reference range is set, a determination reference range is set based on the currently acquired amount of light received (Step S305). Specifically, a range determined by defining the currently acquired amount of light received as a reference and adding a predetermined width (0.1%) to the reference is set as the determination reference range. After that, the process for calibration is terminated.

In a case where the determination reference range is set, it is determined whether the currently acquired amount of light received falls within the determination reference range (Step S306). In a case where it is within the determination reference range, that is, in a case where the amount of light received hardly changes, an update process (an addition process) for a check counter is performed (Step S307). The check counter is a counter for storing the number of times (the continuous number of times) that the amount of light received is within the determination reference range. After that, it is determined whether a value of the check counter exceeds a preset value. In a case where the preset value is not exceeded, the present process for calibration is simply terminated.

In a case where the preset value is exceeded, the current amount of light received and the reference amount of light received are compared (Step S309) and the above-described threshold is corrected by using a correction value determined based on the comparison result (Step S310). After that, the preparation flag is deleted (Step S311) and the operation of the fan 58 is restarted (Step S312), and then the present process for calibration is terminated. The process in Step S309 to S312 is similar to the process in Step S203 to S206.

In contrast, in a case where the currently acquired amount of light received is out of the determination reference range, the determination reference range is set again based on this amount of light received (Step S313) and the check counter is cleared to zero, and then the present process for calibration is terminated. The process in Step S313 is similar to the process in Step S305.

As described above in detail, in the present embodiment, calibration is performed in response to the stop of a decrease in the amount of light received, which can contribute to reducing the preparation time for calibration and improving the accuracy of calibration.

Other Embodiments

It should be noted that the present disclosure is not limited to the descriptions of the above-described embodiments and may be implemented, for example, as follows. Incidentally, the following configurations may be independently applied to the above-described embodiments or a part or all thereof may be combined and applied to the above-described embodiments. In addition, a part or all of the various configurations according to the above-described embodiments can be combined as desired. In this case, it is desirable that the technical significance (effects to be exhibited) of the configurations to be combined be ensured.

In the above-described embodiments, the sensor unit 50 is disposed in the intake duct 47 for an outside air; however, the sensor unit 50 can be located as desired. For example, it may be located in a living space such as a residential room, which is a target for air conditioning, or outdoors. In a case where the sensor unit 50 is located in a living space, it is preferable that the cleanliness of the air in the living space is monitored and ventilation is provided or ventilation is increased in response to the cleanliness decreasing below a reference value. It should be noted that in a case where the sensor unit 50 is located in a living space, the sensor unit 50 may be installed in the air-conditioning controller 42.

In the above-described embodiments, the ventilation mode is switched based on the detection result from the particle sensor 55; however, in place of or in addition to this configuration, information indicating air cleanliness (for example, a level of cleanliness) may be displayed on a display of the air-conditioning controller 42.

In addition, in a case where, for example, air-conditioning equipment has a function to clean the air by discharging nano-sized electrostatic atomized water particles or the like, air cleaning with the electrostatic atomized water particles may be turned on/off based on the detection result from the particle sensor 55.

In the above-described embodiments, the fan 58 is located within the measurement chamber MC; however, the position of the fan 58 is freely selectable as long as the functions as the stirring means and the ventilation means can be fulfilled. For example, it is also acceptable that the fan 58 is located in the inlet 52 and the fan 58 is stopped in an unstirred state, thereby preventing air and particles from entering the measurement chamber MC.

In the above-described embodiments, forced convection is caused within the measurement chamber MC by the fan 58; however, in place of this, it is also acceptable to cause natural convection within the measurement chamber MC by a heating means such as a heater as the stirring means.

In the above-described embodiments, the detection region DE is set at a position offset toward, among the bottom 51*b* and the ceiling 51*a* of the enclosure 51, the ceiling 51*a*; however, the detection region DE may be set at a position offset toward, among the bottom 51*b* and the ceiling 51*a*, the bottom 51*b*. However, in terms of reducing the preparation time for calibration, setting the detection region DE at a position near the ceiling 51*a* has a technical significance.

In the above-described embodiments, the preparation for calibration is started after the elapse of a period of time (one month) set in advance since the previous calibration; however, conditions for performing calibration are freely selectable. For example, the preparation for calibration may be started based on an execution operation of a user or the preparation for calibration may be started in response to a user turning off air conditioning.

The calibration functions according to the above-described embodiments may be applied to any other air-conditioning equipment such as a room air conditioner or an air cleaning device in place of central air conditioning. In addition, the calibration functions are also applicable to air-conditioning equipment installed in a vehicle such as an automobile, a train, or an airplane in addition to air-conditioning equipment for a building.

What is claimed is:

1. An air-conditioning control system that controls an air conditioner, the air-conditioning control system comprising:
an enclosure provided with a ventilation opening;
a particle sensor configured to detect particles existing in a predetermined region in the enclosure; and
a controller,
wherein the controller is configured to:
control an amount of particles in the predetermined region, the controller being switchable between a first state and a second state where an amount of particles is controlled such that the particles existing in the predetermined region are reduced in amount to be less than in the first state;
compare a detection value acquired from the particle sensor and a threshold in a case of the first state;
perform a predetermined process based on a result of comparing the detection value and the threshold; and
in response to predetermined conditions being satisfied when in the second state, (a) acquire the detection value from the particle sensor, (b) determine a correction value based on the acquired detection value and a reference value, and (c) correct, as targets for the comparison, either the threshold or the detection value, by using the correction value.

2. The air-conditioning control system according to claim 1, wherein the particle sensor is an optical sensor comprising a light emitter and a light receiver disposed opposite the light emitter with the predetermined region in between.

3. The air-conditioning control system according to claim 1, wherein the controller is configured to control the amount of particles in the predetermined region by controlling ventilation in the predetermined region.

4. The air-conditioning control system according to claim 1, comprising a stirring means, for controlling the amount of particles in the predetermined region, configured to stir particles within the enclosure, wherein
the controller is configured to cause the stirring means to operate when in the first state and cause the stirring means to stop when in the second state, and
the predetermined region is set at a position distant from a bottom of the enclosure.

5. The air-conditioning control system according to claim 4, wherein
the predetermined conditions are to be satisfied after elapse of a predetermined period of time since the stirring means is stopped, and
the predetermined region is set at a position offset toward, among a ceiling and the bottom of the enclosure, the ceiling.

6. The air-conditioning control system according to claim 4, wherein
the predetermined conditions are to be satisfied after elapse of a predetermined period of time since the stirring means is stopped,
the particle sensor is an optical sensor comprising a light emitter and a light receiver, and
an optical axis of the light emitter is horizontal.

7. The air-conditioning control system according to claim 1, comprising a moving body, for controlling the amount of particles in the predetermined region, movable to a position for covering the inlet and a position for not covering the inlet, wherein
the enclosure is provided with, as the ventilation opening, an inlet through which air enters the enclosure and an outlet through which air flows out of the enclosure,
the moving body is configured to be placed at the position for covering the inlet where the entry of particles into the enclosure through the inlet is prevented and be placed at the position for not covering the inlet where the entry of particles into the enclosure through the inlet is not prevented, and
the controller is configured to place the moving body at the position for not covering the inlet when in the first state and place the moving body at the position for covering the inlet when in the second state.

8. The air-conditioning control system according to claim 7, wherein the moving body is a shutter that prevents air from passing through.

9. The air-conditioning control system according to claim 7, wherein the moving body is a filter that does not prevent air from passing through while preventing the particles from passing through.

10. The air-conditioning control system according to claim 1, comprising a fan and a filter for controlling the amount particles in the predetermined region, wherein
the enclosure is provided with, as the ventilation opening, an inlet through which air enters the enclosure and an outlet through which air flows out of the enclosure,
the fan is configured to cause air to flow out of the enclosure,
the filter does not prevent air from passing through while preventing the particles from flowing through,
the controller is configured to place the filter at a position for not covering the inlet when in the first state and place the filter at a position for covering the inlet when in the second state, and
the fan is configured to be driven even in a state where the filter is placed at the position for covering the inlet.

11. The air-conditioning control system according to claim 1, comprising an adsorption means, for controlling the amount of particles in the predetermined region, of adsorbing the particles within the enclosure, wherein
the controller is configured to cause the adsorption means to adsorb the particles within the enclosure when in the second state.

12. The air-conditioning control system according to claim 1, wherein the controller is configured to, when in the second state, repeatedly acquire the detection value from the particle sensor and determine that the predetermined conditions are satisfied in response to the repeatedly acquired detection value converging within a predetermined value range.

13. Air-conditioning equipment comprising the air-conditioning control system according to claim 1 and an air conditioner controllable by the air-conditioning control system.

* * * * *